(12) United States Patent
Jain et al.

(10) Patent No.: US 9,681,159 B2
(45) Date of Patent: Jun. 13, 2017

(54) CREATING AUDIENCE SEGMENTS FOR CAMPAIGNS

(71) Applicant: Adobe Systems Incorporated, San Jose, CA (US)

(72) Inventors: Anuj Jain, New Delhi (IN); Atul Kumar Shrivastava, Noida (IN); Praveen Kumar Goyal, Noida (IN); Ashish Duggal, New Delhi (IN)

(73) Assignee: Adobe Systems Incorporated, San Jose, CA (US)

(*) Notice: Subject to any disclaimer, the term of this patent is extended or adjusted under 35 U.S.C. 154(b) by 0 days.

(21) Appl. No.: 14/809,589

(22) Filed: Jul. 27, 2015

(65) Prior Publication Data
US 2017/0034547 A1 Feb. 2, 2017

(51) Int. Cl.
*H04N 7/025* (2006.01)
*H04N 21/234* (2011.01)
*H04N 21/2668* (2011.01)
*H04N 21/258* (2011.01)
*H04N 21/458* (2011.01)
*H04N 21/45* (2011.01)
*H04N 21/81* (2011.01)

(52) U.S. Cl.
CPC . *H04N 21/23424* (2013.01); *H04N 21/23418* (2013.01); *H04N 21/25883* (2013.01); *H04N 21/2668* (2013.01); *H04N 21/458* (2013.01); *H04N 21/4532* (2013.01); *H04N 21/812* (2013.01)

(58) Field of Classification Search
CPC ............. H04N 21/2407; H04N 21/258; H04N 21/25883; H04N 21/44222; H04N 21/44204
See application file for complete search history.

(56) References Cited

U.S. PATENT DOCUMENTS

| | | | |
|---|---|---|---|
| 8,365,213 B1* | 1/2013 | Orlowski | G06Q 30/0251 725/13 |
| 9,148,680 B1* | 9/2015 | Fulton | H04N 21/252 |
| 2002/0095676 A1* | 7/2002 | Knee | H04N 7/163 725/46 |
| 2003/0067554 A1* | 4/2003 | Klarfeld | G11B 27/105 348/461 |
| 2004/0148625 A1* | 7/2004 | Eldering | H04N 7/165 725/34 |

(Continued)

*Primary Examiner* — Pankaj Kumar
*Assistant Examiner* — Timothy Newlin
(74) *Attorney, Agent, or Firm* — Wolfe-SBMC

(57) ABSTRACT

Creating audience segments for campaigns is described. In one or more embodiments, an audience manager is configured to create, for one or more videos, a video audience segment associated with the video by storing, in a data management platform, user identifiers of users that viewed the video. The user identifiers can be received from a client player each time that a video is played at the client player. The audience manager is further configured to extract demographic information from a demographic report associated with the video that is received from a demographics provider, and to associate the demographic information with the video audience segment. The audience manager is further configured to generate a target audience segment for a campaign by merging and combining user identifiers that are included in two or more video audience segments.

20 Claims, 10 Drawing Sheets

414

| Audience Segment | Segment ID | Associated Video ID | (male + female) | % female |
|---|---|---|---|---|
| Audience segment common to both 1 and 2 | Seg_1 AND Seg_2 | {6,10} AND {1,4} | 50,000 | 82 |
| Audience segment only 1 | Seg_1 AND !Seg_2 | {6,10} AND NOT {1,4} | 500,000 | 70 |
| Audience segment only 2 | !Seg_1 AND Seg_2 | NOT {6,10} AND {1,4} | 1,000,000 | 62 |

(56) References Cited

U.S. PATENT DOCUMENTS

| | | | | |
|---|---|---|---|---|
| 2011/0016479 A1* | 1/2011 | Tidwell | ............ | G06Q 30/02 |
| | | | | 725/9 |
| 2011/0016482 A1* | 1/2011 | Tidwell | ............ | G06Q 30/00 |
| | | | | 725/14 |
| 2011/0078718 A1* | 3/2011 | Jakobi | ............ | G06Q 10/00 |
| | | | | 725/14 |
| 2012/0042338 A1* | 2/2012 | Kitts | ............ | H04N 21/25866 |
| | | | | 725/35 |
| 2012/0254911 A1* | 10/2012 | Doe | ............ | H04N 21/25866 |
| | | | | 725/14 |
| 2012/0324550 A1* | 12/2012 | Wasilewski | ............ | G06F 21/10 |
| | | | | 726/5 |
| 2013/0014161 A1* | 1/2013 | Stallard | ............ | H04N 7/165 |
| | | | | 725/35 |
| 2013/0024889 A1* | 1/2013 | Yan | ............ | H04L 12/1881 |
| | | | | 725/32 |
| 2014/0040008 A1* | 2/2014 | Belani | ............ | G06Q 30/02 |
| | | | | 705/14.41 |
| 2014/0196081 A1* | 7/2014 | Emans | ............ | G06Q 30/0273 |
| | | | | 725/32 |
| 2014/0237496 A1* | 8/2014 | Julian | ............ | H04N 21/44213 |
| | | | | 725/13 |
| 2016/0117719 A1* | 4/2016 | Hood | ............ | G06Q 30/0247 |
| | | | | 705/14.42 |
| 2016/0119689 A1* | 4/2016 | Hood | ............ | G06Q 30/0244 |
| | | | | 725/14 |

* cited by examiner

400

| Video ID | Female | Male | % Female |
|---|---|---|---|
| 1 | 2,400,000 | 1,500,000 | 62 |
| 2 | 1,800,000 | 2,200,000 | 45 |
| 3 | 1,200,000 | 1,300,000 | 48 |
| 4 | 800,000 | 600,000 | 57 |
| 5 | 600,000 | 900,000 | 40 |
| 6 | 1,100,000 | 400,000 | 73 |
| 7 | 500,000 | 1,400,000 | 26 |
| 8 | 200,000 | 400,000 | 33 |
| 9 | 1,350,000 | 1,150,000 | 54 |
| 10 | 2,200,000 | 1,000,000 | 69 |
| 11 | 1,000,000 | 2,200,000 | 31 |
| 12 | 1,400,000 | 1,420,000 | 50 |

| Video ID | Genre | Duration (sec) | Female | Male | % Female |
|---|---|---|---|---|---|
| 1 | Drama | 2000 | 2,400,000 | 1,500,000 | 62 |
| 2 | Sports | 1200 | 1,800,000 | 2,200,000 | 45 |
| 3 | Comedy | 1500 | 1,200,000 | 1,300,000 | 48 |
| 4 | Family | 1800 | 800,000 | 600,000 | 57 |
| 5 | News | 120 | 600,000 | 900,000 | 40 |
| 6 | Family | 2800 | 1,100,000 | 400,000 | 73 |
| 7 | Sports | 3000 | 500,000 | 1,400,000 | 26 |
| 8 | Sports | 2100 | 200,000 | 400,000 | 33 |
| 9 | Family | 3000 | 1,350,000 | 1,150,000 | 54 |
| 10 | Comedy | 2800 | 2,200,000 | 1,000,000 | 69 |
| 11 | Automotive | 240 | 1,000,000 | 2,200,000 | 31 |
| 12 | Comedy | 1200 | 1,400,000 | 1,420,000 | 50 |

| Segment ID (124) | Video IDs (410) | Female (402) | Male (402) | % Female (402) | Estimated Audience Size (412) |
|---|---|---|---|---|---|
| 1 | 6,10 | 3,300,000 | 1,400,000 | 70 | 3,000,000 |
| 2 | 1,4 | 3,400,000 | 2,100,000 | 62 | 3,500,000 |
| 3 | 3,9,12 | 3,950,000 | 3,870,000 | 51 | 4,200,000 |
| 4 | 5, | 600,000 | 900,000 | 40 | 1,500,000 |
| 5 | 7,8,11 | 1,700,000 | 4,000,000 | 30 | 3,000,000 |

| Audience Segment | Segment ID | Associated Video ID | (male + female) | % female |
|---|---|---|---|---|
| Audience segment common to both 1 and 2 | Seg_1 AND Seg_2 | {6,10} AND {1,4} | 50,000 | 82 |
| Audience segment only 1 | Seg_1 AND !Seg_2 | {6,10} AND NOT {1,4} | 500,000 | 70 |
| Audience segment only 2 | !Seg_1 AND Seg_2 | NOT {6,10} AND {1,4} | 1,000,000 | 62 |

502
Identify two or more similar video audience segments

504
Merge the similar video audience segments to generate one or more merged audience segments

CREATING AUDIENCE SEGMENTS FOR CAMPAIGNS

As advertisers plan an advertising campaign, they define a target demography of audience based on gender, age-group, income level, and so forth. Most advertisers understand that it is difficult to achieve a 100% on-target rate for a campaign. For example, if an advertiser's campaign is intended to be shown to only women, it is likely that at least some men will also view the campaign. Using industry benchmarks, calculated by a demographics provider such as Nielsen®, that are based on historical campaign data from Nielsen® Digital Ad Ratings, an advertiser can figure out that on average, campaigns with a defined audience of women achieve a 75% on-target rate (meaning that 25% of the audience that views the campaign will be male).

Hence, an advertiser may ask a content publisher (e.g., Comcast®, Sony® Crackle, Netflix®, and Hulu®) to promise that they will provide them with at least a 75% on-target rate or more. Conventionally, publishers attempt to reach the advertiser-specified demography in a variety of different ways, such as by using first party data such as type of content watched or by targeting the campaigns to user segments created based on certain heuristics, such as users who have clicked on a cosmetics ad in past. In this way, publishers can guess that certain audiences are likely to be of a certain demographic makeup, such as females, and then they will show the campaign to such audiences.

After the campaign, demographics data may be collected to determine the actual demography of the views of the campaign. For example, if the campaign is to be shown during a particular video, the demographics provider can calculate the percentage of women in the audience that actually viewed the video.

Conventionally, if a shortfall occurs, the advertiser may pay less or even charge a penalty to the publisher. For example, if audience turns out to be 60% women, the advertiser may ask to pay only for the 60% of women that viewed the campaign (rather than the 75% that was requested).

Content publishers generally incur huge impression wastage (in the tune of 40-45%) when they guess audience demography using first party and third party data available to them, such as the type of content watched and user segments. This occurs because there is often a mismatch between what a demographics provider, such as Nielsen®, reports and the demography calculated by the publisher. Many advertisers will only pay for the on-target impressions reported by Nielsen®. While publishers and advertisers have made their peace with similar wastage in the traditional TV world, they expect much better results in the digital world given the power of addressability of digital content.

SUMMARY

Creating audience segments for campaigns is described. In one or more embodiments, an audience manager is configured to create, for one or more videos, a video audience segment associated with the video by storing, in a data management platform, user identifiers of users that viewed the video. The user identifiers can be received from a client player each time that a video is played at the client player. The audience manager is further configured to extract demographic information from a demographic report associated with the video that is received from a demographics provider, and to associate the demographic information with the video audience segment, such as by storing the demographic information with the video audience segment in the data management platform.

In one or more embodiments, the audience manager is further configured to receive a request to target a campaign to an audience of a particular demography. In response, the audience manager can identify at least two video audience segments maintained in the data management platform in which a majority of the users are associated with the particular demography, and generate a target audience segment that includes user identifiers of users that are common to each of the at least two identified video audience segments. The campaign may then be targeted to users in the target audience segment.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 4A illustrates an example of video audience segments stored in a data management platform.

FIG. 4B illustrates an additional example of video audience segments stored in a data management platform.

FIG. 4C illustrates an example of merged audience segments stored in a data management platform.

FIG. 4D illustrates an example of target audience segments stored in a data management platform.

DETAILED DESCRIPTION

Overview

Figure 1:
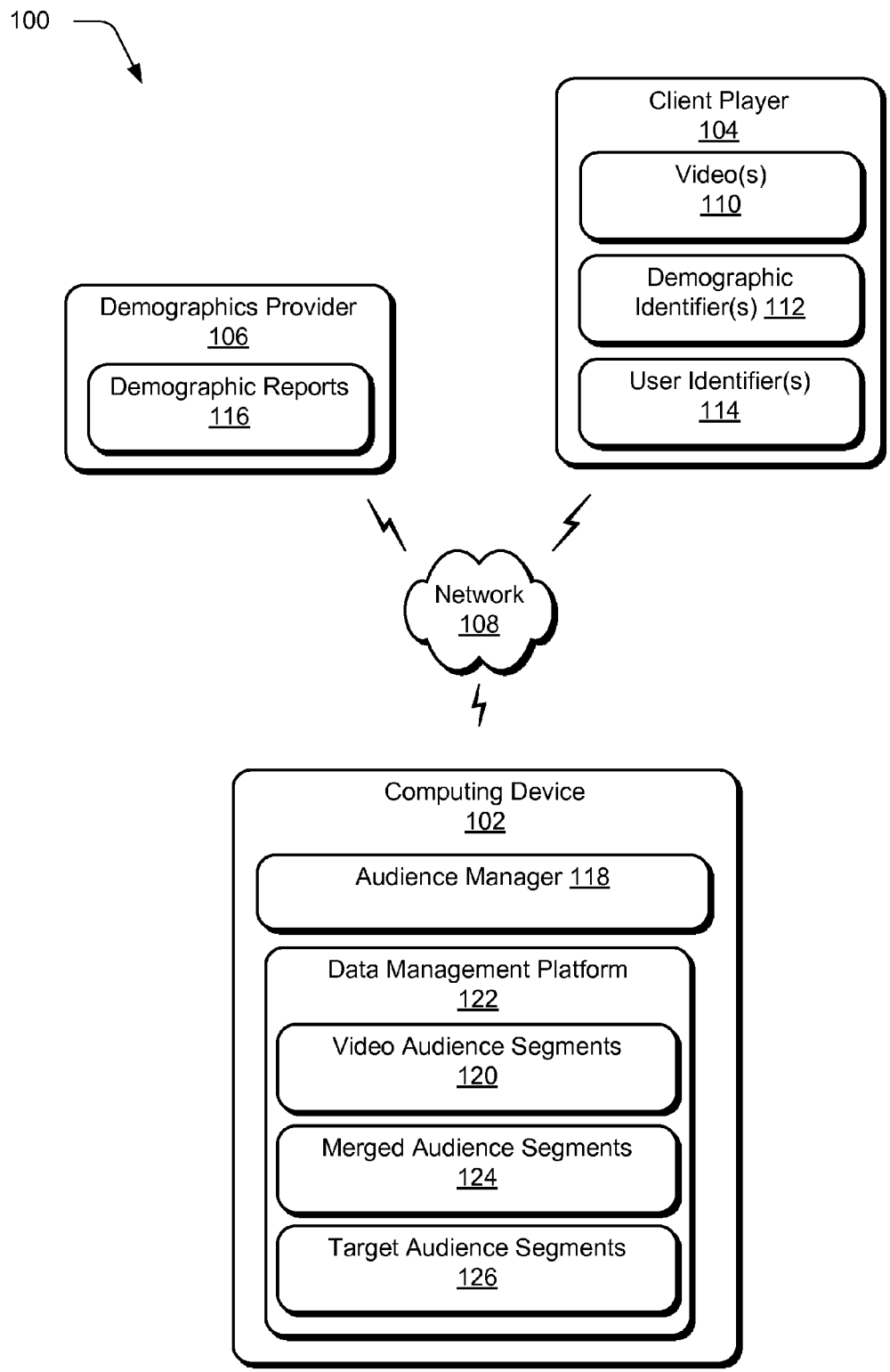
FIG. 1 illustrates an environment in an example embodiment that is operable to employ techniques described herein.

Content publisher's (e.g., Comcast®, Sony® Crackle, Netflix®, and Hulu®) generally incur huge impression wastage (in the tune of 40-45%) when they guess audience demography using first party and third party data available to them, such as the type of content watched and user segments.

Techniques described herein combine past demography data of audiences that watch videos on a publisher's platform with audience data stored in the publisher's data management platform to generate audience segments that correspond to a demography and size requested for an advertising campaign. As described herein, a campaign can include any type of advertisement or marketing campaign, which can take any type of form such as video, images, music, and so forth. When the campaign is targeted to these audience segments, the demography reported by a demographics provider (such as Nielsen® post-serving the campaign) will closely match with the intended demography of the campaign. Thus, the described techniques reduce impression wastage for publishers, while boosting their revenue.

In one or more embodiments, an audience manager is configured to create, for one or more videos, a video audience segment associated with the video by storing, in a data management platform, user identifiers of users that viewed the video. The user identifiers can be received from a client player each time that a video is played at the client player. During playback of the video, the client player may be further configured to communicate a demographic identifier that includes demographic information about the user to a demographics provider.

The demographics provider may be implemented as a third-party demographics provider (e.g., Nielsen) that is unaffiliated with the audience manager. The demographics provider is configured to use the demographic identifiers to generate a demographic report for the video that includes various demographic information about the users that viewed the video, such as the percentage of users that are female, the percentage of users that are within a certain age range, and so forth.

The audience manager is configured to receive the demographic report from the demographics provider, and extract demographic information from the demographic report. The demographic information is then associated with the respective video audience segment, such as by storing the demographic information with the video audience segment in the data management platform. Since the video audience segments each include user identifiers and demographic information, this enables audience manager to know the demography of the users in each video audience segment. For example, if a video audience segment includes 100 user identifiers, and a demography of the video audience segment is determined to be 70% female, then the audience manager can assume that 70% of the user identifiers correspond to female users.

In one or more embodiments, the audience manager is further configured to identify two or more similar video audience segments from the video audience segments stored in the data management platform, and to merge the similar video audience segments to generate a merged audience segment such that the merged audience segment includes user identifiers that are included in at least one of the two or more similar audience segments.

The audience manager is further configured to receive a request to target a campaign to an audience of a particular demography. In response, the audience manager can identify at least two video audience segments maintained in the data management platform in which a majority of the users are associated with the particular demography. In one or more embodiments, the at least two video audience segments correspond to merged audience segments formed by merging two or more of the video audience segments that are similar. Next, the audience manager generates a target audience segment that includes user identifiers of users that are common to each of the at least two identified video audience segments. The campaign may then be targeted to users in the target audience segment. Campaigns can be targeted in a variety of ways, such as by playing a video advertisement when a user is watching a particular video, causing a video advertisement to play in a user's social network newsfeed, and so forth. Because the campaign is targeted to the target audience segment which is generated based on demographics data, the demography reported by the demographics provider (such as Nielsen® post-serving the campaign) will closely match with the intended demography of the campaign. Thus, the described techniques reduce impression wastage for publishers, while boosting their revenue.

Example Environment

FIG. 1 illustrates an environment 100 in an example embodiment that is operable to employ techniques described herein. Environment 100 includes a computing device 102, a client player 104, and a demographics provider 106 that are communicatively coupled via a network 108.

Computing device 102 may be configured as a desktop computer, a laptop computer, a mobile device (e.g., assuming a handheld configuration such as a tablet or mobile phone), and so forth. Thus, computing device 102 may range from full resource devices with substantial memory and processor resources (e.g., personal computers, game consoles) to low-resource devices with limited memory and/or processing resources (e.g., mobile devices). Additionally, although a single computing device 102 is shown, computing device 102 may be representative of a plurality of different devices, such as multiple servers utilized by a business to perform operations "over the cloud" as further described in relation to FIG. 7.

Although network 108 is illustrated as the Internet, the network may assume a wide variety of configurations. For example, network 108 may include a wide area network (WAN), a local area network (LAN), a wireless network, a public telephone network, an intranet, and so on. Further, although a single network 108 is shown, network 108 may also be configured to include multiple networks.

Client player 104 is configured to play videos 110. Client player 104 may be associated with a publisher that provides access to digital videos via a web platform or website. Examples of publishers may include, by way of example and not limitation, Comcast®, Sony® Crackle, Hulu®, or Netflix®. Examples herein will describe playback of videos 110 via client player 104. However, the described techniques and apparatuses may also apply to content or programs other than videos, such as music, photos, video games, and so forth.

During playback of a video 110, client player 104 is configured to communicate a demographic identifier 112 to demographics provider 106 over network 108, and to communicate a user identifier 114 to computing device 102 over network 108. For example, a Nielsen software development kit (SDK) may be implanted at client player 104 to cause the demographic identifier 112 to be communicated to Nielsen.

Demographic identifier 112 can be implemented as any type of identifier or "pixel" that includes demographic information about a user of client player 104 that is viewing video 110. Demographic identifier 112 may include a variety of different types of demographic information about a user, including by way of example and not limitation, the user's gender, age, income level, or location.

User identifier 114 uniquely identifies the user and/or the user's computing device or machine that is used to access client player 104 to view video 110. For example, user identifier 114 may be implemented as an Adobe® Audience Manager (AAM) pixel, a unique user id (UUID), a user login name, a user email address, or a machine identifier, to name just a few. Notably, therefore, demographic identifier 112 provides demographic information about the user but does not uniquely identify the user, whereas user identifier 114 uniquely identifies the user but may not include demographic information about the user.

Demographics provider 106 can be implemented as any type of service that provides demographic information regarding an audience of users that view a particular video. In various embodiments, demographics provider 106 is implemented as a "neutral" or "third party" demographics provider that is unaffiliated with content providers, publishers, or advertisers.

For instance, demographics provider 106 can be implemented as Nielson® demographics provider. Currently, Nielsen® is the one of the most popular demographics providers for television and digital television campaigns, and can provide demographic information about an audience such as gender, age-group, income level, and so forth. It is to be appreciated, however, that demographics provider 106 can be implemented as any type of service that generates demographic information about an audience of users that view a video 110, such as Comscore®, Rentrak®, and so forth.

In accordance with various embodiments, demographics provider 106 is configured to generate a demographic report 116 that identifies the demography of the audience of viewers that watch each video. Demographic report 116 may be based on the demographic identifiers 112 received from the client player 104. The demographic report 116 may be provided after users view the video, such as a "next day" report that provides demographic information about users that viewed a video on the previous day. Generally, the demographic report provides demographic information about users, such as by providing percentages or ratios of users that viewed the video based on gender, age, income level, location, and so forth. For example, demographic report 116 may indicate that a particular video 110 was viewed by an audience that was 70% female and 30% male.

In one or more embodiments, demographic report 116 does not include any identifying information about particular users. Thus, while demographic report 116 can be used to determine, after a video 110 is viewed, whether the video reached its intended audience, the demographic report 116 may not be usable to target future videos or campaigns to any one particular audience.

Computing device 102 is illustrated as including an audience manager 118, which can be implemented by a publisher, advertiser, or business owner to target advertising campaigns to users. Audience manager 118 is representative of functionality to generate video audience segments 120 for videos 110 on a publisher's platform that can be viewed using client player 106. Audience manager associates the user identifiers 114 of user's that watch a video 110 with the respective video audience segment 120. Additionally, audience manager 118 can associate demographic information extracted from demographic reports 116 with the respective video audience segment 120. Audience manager 118 may store video audience segments 120 in a data management platform 122. Data management platform 122 can be implemented as any type of data store or database and may be implemented local or remote to audience manager 118.

In one or more embodiments, audience manager 118 is configured to identify two or more similar video audience segments from video audience segments 120 stored in data management platform 122, and to merge the similar video audience segments to generate merged audience segment 124. Merged audience segments 124 may include user identifiers that are included in at least one of the two or more similar video audience segments.

In one or more embodiments, audience manager 118 is configured to receive a request to target a campaign to an audience of a particular demography. In response to receiving the request, audience manager 118 can identify two of the similar audience segments 124 having a majority of users of the particular demography, and generate a target audience segment 126 by combining user identifiers that are common to each of the identified two audience segments having a majority of users of the particular demography.

Further discussion of the functionality of audience manager 118 can be found below with reference to FIGS. 2-7.

Figure 7:
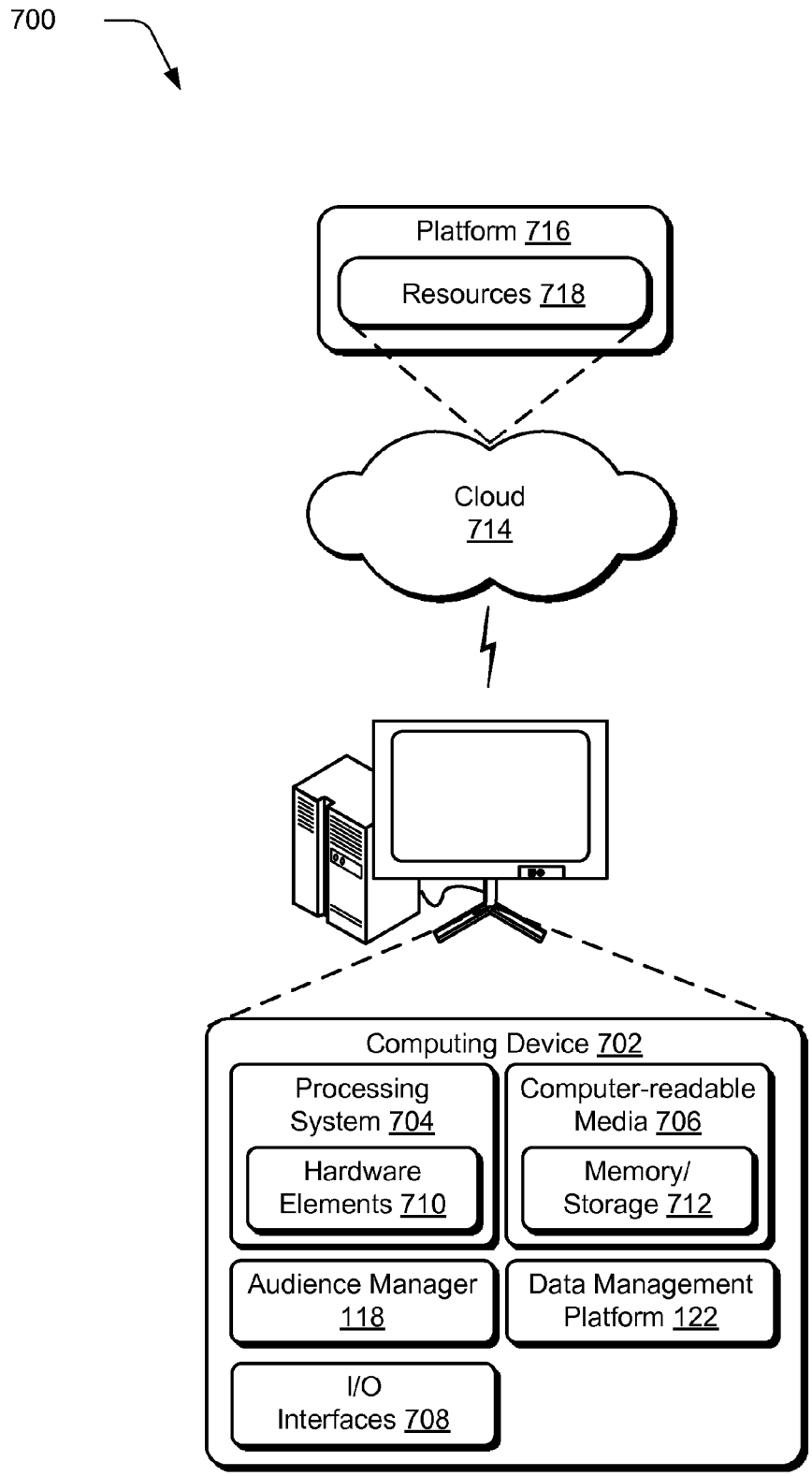
FIG. 7 illustrates an example system that includes an example computing device that is representative of one or more computing systems and/or devices that may implement the various techniques described herein.

Although illustrated as part of computing device 102, functionality represented by audience manager 118 and data management platform 122 may be further divided, such as to be performed "over the cloud" by one or more servers that are accessible via network 108, further discussion of which may be found in relation to FIG. 7.

Example Procedures

The following discussion describes techniques for creating audience segments for campaigns that may be implemented utilizing the previously described systems and devices. Aspects of the procedure may be implemented in hardware, firmware, or software, or a combination thereof. The procedures are shown as a set of blocks that specify operations performed by one or more devices and are not necessarily limited to the orders shown for performing the operations by the respective blocks.

Figure 2:
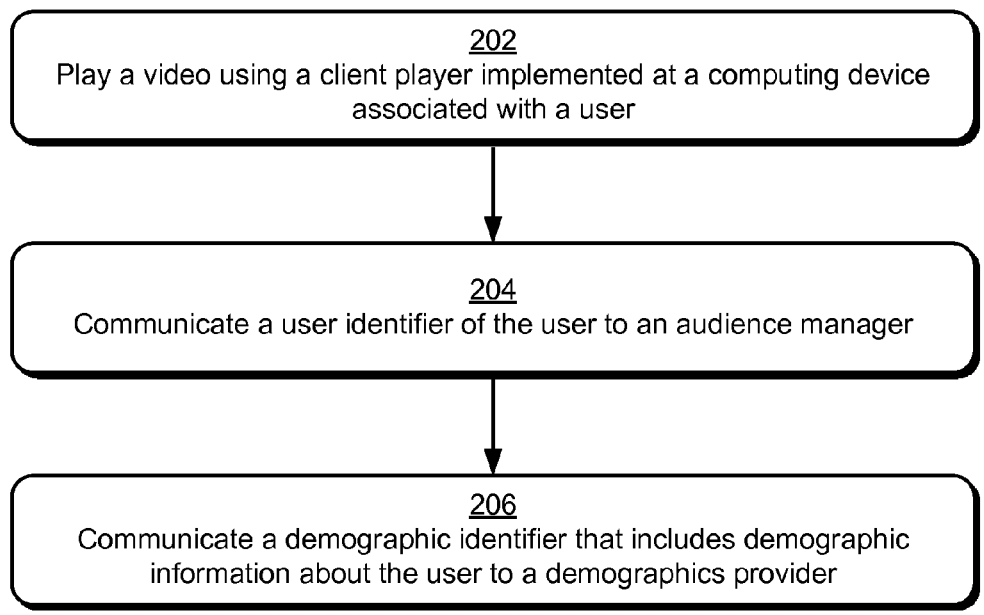
FIG. 2 illustrates a procedure in an example embodiment of communicating a user identifier and a demographic identifier during playback of a video at a client player.

FIG. 2 illustrates a procedure 200 in an example embodiment of communicating a user identifier and a demographic identifier during playback of a video at a client player. Procedure 200, for example, may be implemented by a client player, such as client player 104 (FIG. 1).

At 202, a video is played at a client player implemented at a computing device associated with a user. For example, client player 104 plays a video 110 at a computing device associated with a user.

At 204, during or after playback of the video, a user identifier is communicated to an audience manager, and at 206 a demographic identifier that includes demographic information about the user is communicated to a demographics provider. For example, during playback of video 110, client player 104 communicates user identifier 114 to audience manager 118 and communicates demographic identifier 112 to demographics provider 106. As discussed above, the demographic identifier 112 enables demographics provider 106 to generate a demographic report 116 regarding users that viewed the video, such as a Nielsen® report.

Generating Video Audience Segments

Figure 3:
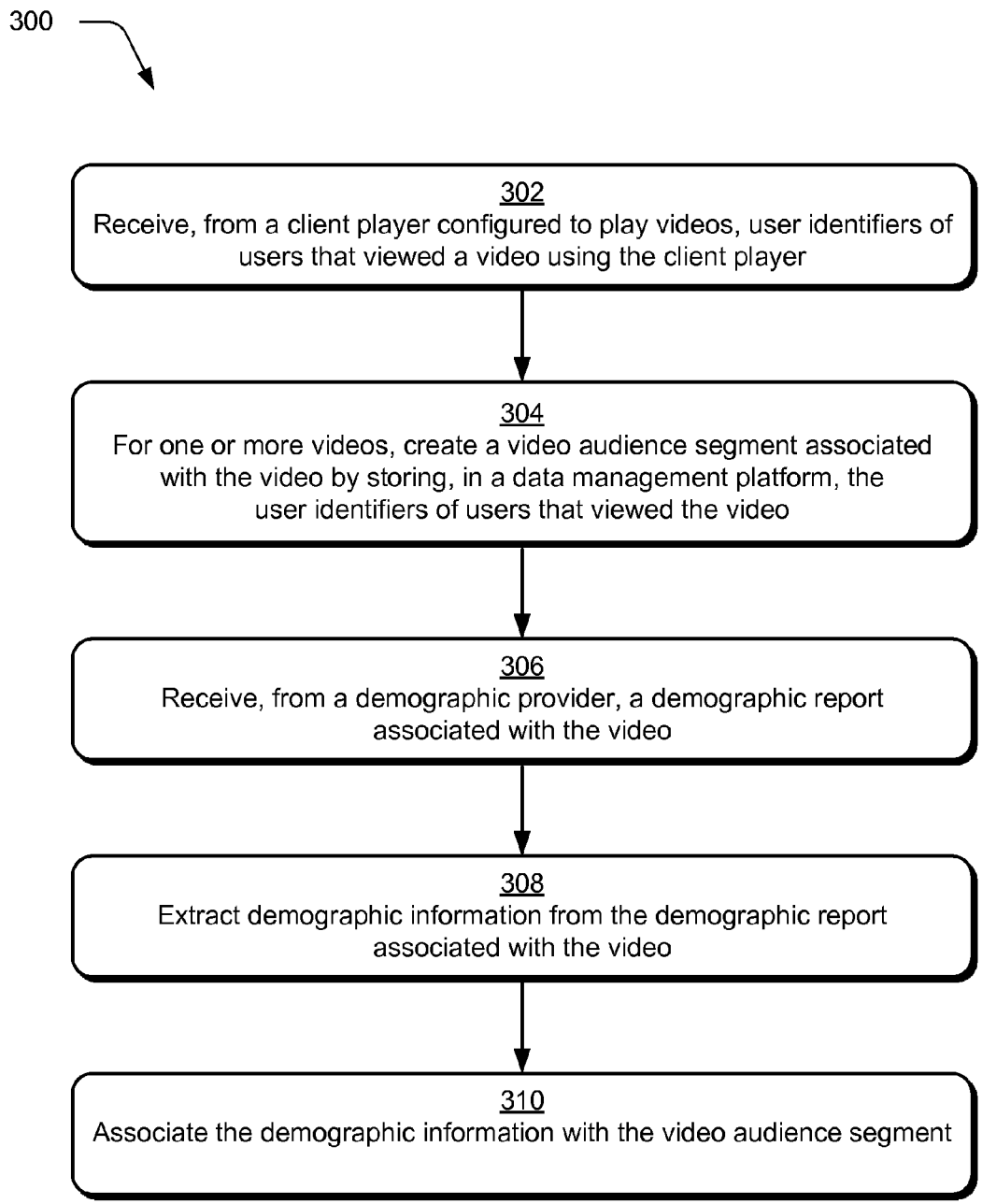
FIG. 3 illustrates a procedure in an example embodiment of generating video audience segments.

FIG. 3 illustrates a procedure 300 in an example embodiment of generating video audience segments. Procedure 300, for example, may be implemented by an audience manager, such as audience manager 118 (FIG. 1).

At 302, user identifiers of users that viewed a video using a client player are received from the client player. For example, audience manager 118 receives a user identifier 114 when a video 110 is viewed by a user using client player 104. User identifier 114 uniquely identifies the user and/or the computing device or machine utilized by the user to view video 110 using client player 104. In some cases, user identifier 114 may also include an identifier of the video 110.

At 304, for one or more videos, a video audience segment associated with the video is created by storing the user identifiers of users that viewed the video in a data management platform. For example, audience manager 118 creates a video audience segment 120 for video 110 by generating an identifier of the video and storing user identifiers 114 of users that viewed the video in data management platform 122 with the identifier of the video.

At 306, a demographic report associated with the video is received from a demographics provider. For example, audience manager 118 receives demographic reports 116 (e.g., a Nielsen® report) from demographics provider 106. In one or more embodiments, demographics provider 106 is a third party demographics provider that is unaffiliated with audience manager 118.

At 308, demographic information is extracted from the demographic report, and at 310 the demographic information is associated with the video audience segment. For example, audience manager 118 extracts demographic information from demographic report 116, and associates the demographic information with the respective video audience segment 120, such as by storing the demographic information with the respective video audience segment in data management platform 122.

Since video audience segments 120 each include user identifiers 114 and demographic information, this enables audience manager 118 to know the demography of the users in each video audience segment 120. For example, if a video audience segment 120 includes 100 user identifiers 114, and a demography of the video audience segment 120 is determined to be 70% female, audience manager 118 can assume that 70% of the user identifiers 114 correspond to female users.

By way of example, consider FIG. 4A which illustrates an example 400 of video audience segments stored in a data management platform.

In this example, data management platform 122 stores video audience segments 120 for 12 different videos, which are each identified with a video ID. While not pictured in FIG. 4A, each video audience segment also includes associated user identifiers 114. In addition, each video audience segment 120 includes demographic information 402 which has been extracted from demographic reports 116. In this example, demographic information 402 includes the total number of females and males that viewed each video, as well as a percentage of the total audience that is female. The column "% Female" represents whether the video audience segment is "female dominant" in which a majority of the users are female or "male dominant" in which a majority of the users are male. Video audience segments having a value that is greater than 50% can be considered "female dominant", whereas video audience segments having a value that is less than 50% can be considered "male dominant". For example, the video audience segment for video 1 can be considered female dominant because demographic information 402 indicates that 2,400,000 females and 1,500,000 males viewed the video, which corresponds to an audience that is 62% female. In contrast, the video audience segment for video 2 can be considered male dominant because demographic information 402 indicates that 1,800,000 females and 2,200,000 males viewed the video, which corresponds to an audience that is 45% female and 55% male. Of course, as described throughout, demographic information 402 may correspond to demographic information other than gender, such as age, location, income, and so forth.

Note that a campaign could be targeted to video audience segments 120. For example, a campaign targeted to the video audience segment associated with video 1 in FIG. 4A would be expected to be viewed by an audience that is 62% female. However, techniques discussed below will describe how the video audience segments can be merged and combined in order to generate target audience segments 126 that correspond to a particular demographic distribution and size requested for an advertising campaign.

Merging Similar Video Audience Segments

Audience manager 118 is configured to automatically generate a target audience segment 126 of a particular demography and size for an advertiser's campaign by merging and combining video audience segments 120. For example, to merge video audience segments 120, user identifiers from each of the similar segments may be combined to form a new merged audience segment. The target audience segment is configured such that when the advertiser's campaign is targeted to target audience segment 126, the demography reported by demographics provider 106 (such as Nielsen® post-serving the campaign) will closely match with the intended demography of the target audience segment. Notably, therefore, the described techniques reduce impression wastage for publishers and advertisers alike.

Prior to generating the target audience segments, audience manager 118 may be implemented to merge similar video audience segments 120 in order to generate one or more merged audience segments 124.

Figure 5:
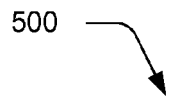
FIG. 5 illustrates a procedure in an example embodiment of merging similar video audience segments in order to generate one or more merged audience segments.

FIG. 5 illustrates a procedure 500 in an example embodiment of merging similar video audience segments in order to generate one or more merged audience segments. Procedure 500, for example, may be implemented by an audience manager, such as audience manager 118 (FIG. 1).

At 502, two or more similar video audience segments are identified from video audience segments associated with videos, and at 504 the similar video audience segments are merged to form one or more merged audience segments. For example, audience manager 118 accesses video audience segments 120 associated with videos 110 from data management platform 122 and identifies similar video audience segments. Consider, that the number of videos 110 a publisher has on their platform may be very high, such as in the order of thousands. Out of these videos some of them will be very similar, and thus may have similar audience demographic distributions as well.

Audience manager 118 can identify similar video audience segments in a variety of different ways. In one or more embodiments, audience manager 118 identifies similar video audience segments based on a similarity of the audience's demographic information. For example, video audience segments in which a majority of the users are female may be determined to be similar video audience segments. Alternately or additionally, audience manager 118 can identify similar audience segments based on a similarity in video metadata associated with the video audience segments. Audience manager 118 can be implemented to maintain various types of video metadata in data management platform 122, such as video name, series name, genre, category, duration, language, artist, publisher site, and so forth.

As an example, consider FIG. 4B, which illustrates an additional example 404 of video audience segments stored in a data management platform. In this example, the video audience segments illustrated in FIG. 4A have been updated to include video metadata 406. Video metadata 406, in this example, corresponds to a genre and a duration of each video.

In one or more embodiments, audience manager 118 merges the similar video audience segments to generate one or more merged audience segments 124 based on similarity in the video metadata and/or a similarity in the audience's demography using a clustering algorithm, such as the K-means clustering algorithm.

The K-means clustering algorithm can be summarized as follows. First, determine the number of clusters K. For this example, assume audience manager 118 selects K to be equal to 5. Second, initialize the center of the clusters as centroids. Third, attribute the closest cluster based upon Audience Segment distance to each data point (video audience segment). Fourth, reset the position of each cluster to the mean of all data points belonging to that cluster. Fifth, repeat steps three and four until convergence. A more detailed description of the K-means clustering algorithm can be found in the section titled "K-Means Clustering Algorithm", below.

As an example of merged audience segments, consider FIG. 4C which illustrates an example 408 of merged audience segments stored in a data management platform.

In this example, audience manager 118 merges similar video audience segments 120 using the K-means clustering algorithm, where K is set to a value of 5, to generate 5 merged audience segments 124. As illustrated in column 410 of FIG. 4C, a first merged audience segment 124 is formed by merging similar video audience segments 120 associated with videos 6 and 10, a second merged audience segment 124 is formed by merging similar video audience segments 120 associated with videos 1 and 4, a third merged audience segment 124 is formed by merging similar video audience segments associated with videos 3, 9, and 12, a fourth merged audience segment 124 includes the video audience segment associated with video 5 (there are no similar audience segments), and a fifth merged audience segment 124 is formed by merging similar video audience segments associated with videos 7, 8, and 11.

Note that the similar audience segments have similar video metadata and/or similar demographic information. For example, videos 6 and 10, of the first merged audience segment, each have a duration of 2800 seconds, and their video audience segments are both approximately 70% female.

In FIG. 4C, the number of male and female viewers indicated in demographic information 402 corresponds to the sum of users associated with each of the merged similar video segment as determined by demographics provider 106. However, this may not be the correct number of viewers because there may be common audiences between the similar video segments. Thus, in some cases the audience size may be adjusted by requesting an estimated audience size from audience manager 118. In this example, audience manager 118 has provided an estimated audience size 412. Notably, the estimated audience size is less than the audience size determined by combining the audiences for similar video audience segments.

Generating Target Audience Segments

The video audience segments 120 and/or the merged audience segments 124 could be used to target a campaign towards the audience associated with a particular audience segment. Oftentimes, however, an advertiser requests that their campaign be targeted to an audience of a particular demography and/or a particular size. Accordingly, as will be described below, audience manager 118 can be implemented to generate a target audience segment 126 using video audience segments 120 and/or merged audience segments 124, where the target audience segment 126 corresponds to the particular demography and/or size requested for the campaign.

Figure 6:
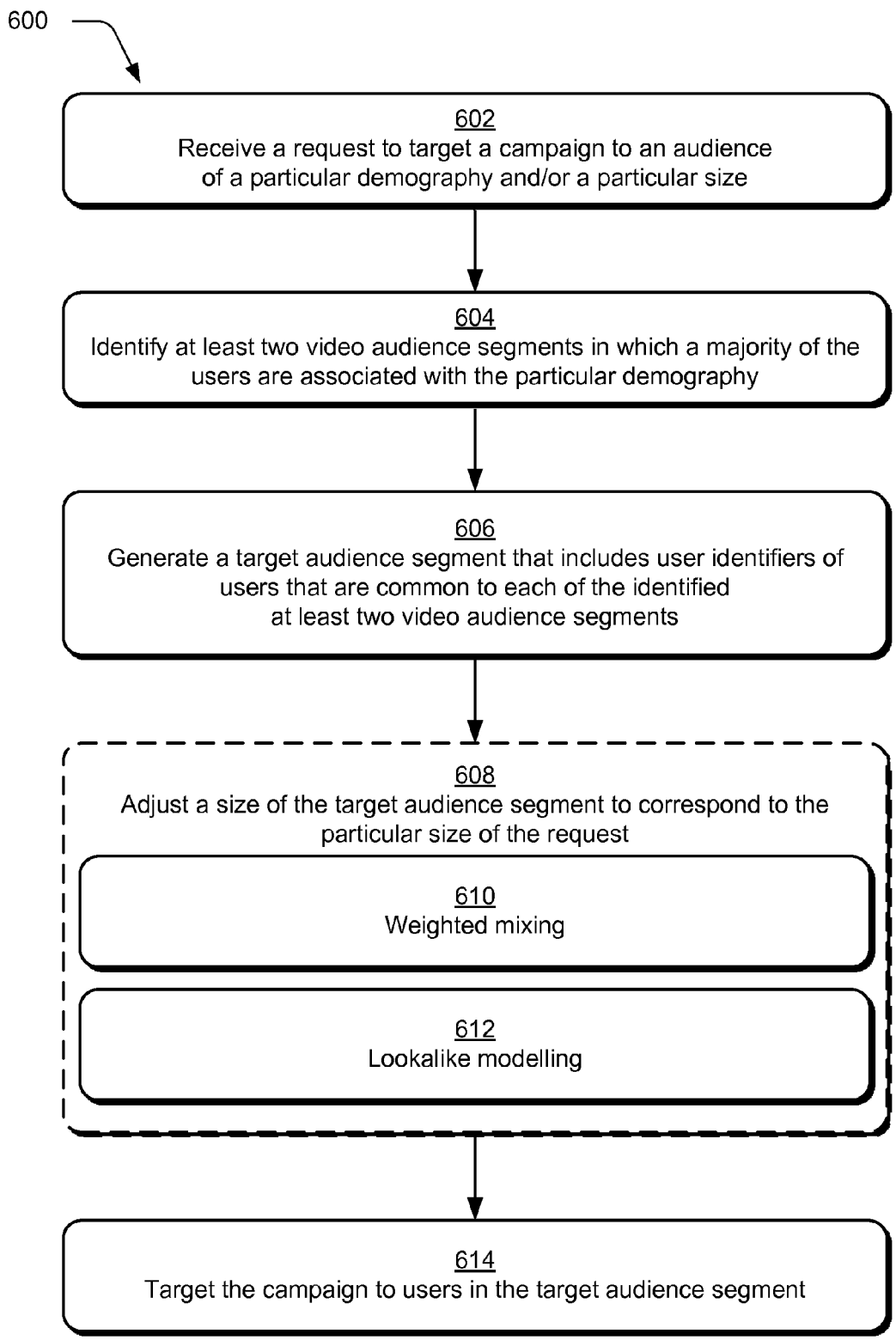
FIG. 6 illustrates a procedure 600 in an example embodiment of generating a target audience segment.

As an example, consider FIG. 6 which illustrates a procedure 600 in an example embodiment of generating a target audience segment. Procedure 600, for example, may be implemented by an audience manager, such as audience manager 118 (FIG. 1).

At 602, a request is received to target a campaign to an audience of a particular demography and/or a particular size. Continuing with the example above, assume that audience manager 118 receives a request from an advertiser to target their campaign to an audience of 100,000 users, where at least 75% of the users are female. It should be noted, however, that a request to target a campaign to any type of demography and/or size could be requested. For example, audience manager 118 may receive a request from an advertiser to target their campaign to an audience of 1,000,000 users, where 80% of the users are between the ages of 25 and 34 and earn at least $100,000 annually.

At 604, at least two video audience segments in which a majority of the users are associated with the particular demography are identified. For example, audience manager 118 identifies at least two video audience segments maintained in data management platform 122 in which the majority of the users are associated with the particular demography requested at step 602. As described throughout, an audience segment will have a majority of users of the particular demography requested if the percentage of users of the particular demography is greater than 50%. In one or more embodiments, audience manager may identify video audience segments that have a high percentage of users of the requested demography. For example, an audience segment that has 70% females may be selected over an audience segment having just 55% females. However, the audience segments may also be identified based on size. For instance, if the audience segment with 55% females has a size of 1,000,000 users, this segment may be selected over the audience segment with just 70% females if this segment has just 1,000 users.

As will be described hereafter, the audience segments selected at step 604 correspond to merged audience segments 124 that are generated by combining similar video audience segments 120. However, in some instances, audience manager 118 may also use video audience segments 120 and/or a combination of video audience segments 120 and merged audience segments 124. Notably, when audience manager 118 uses merged audience segments 124, the merged audience segments are independent because similar video audiences have already been combined using the K-means clustering algorithm, as described above.

At 606, a target audience segment is generated by combining user identifiers that are common to each of the identified at least two video audience segments. For example, audience manager 118 generates target audience segment 126 by combining user identifiers 114 that are common to each of the identified two video audience segments identified at step 604.

As will be discussed in more detail in the section titled "Bayes' Theorem", user identifiers that are common to at least two video audience segments in which a majority of the users are associated with the particular demography are very highly likely to correspond to that particular demography. For example, if a user identifier is common to two audience segments that have a majority of female users, than it is very likely that the user identifier corresponds a female user.

Additionally, using Bayes' theorem, audience manager 118 can determine the demography and size of target audience segment 126.

As an example, consider FIG. 4D which illustrates an example 414 of target audience segments stored in a data management platform.

In this example, audience manager 118 has identified two audience segments of merged audience segments 124 having a majority of users that are female, namely segment 1 with 70% female users and segment 2 with 62% female users. Next, audience manager 118 has generated an "audience segment common to both 1 and 2" which includes users that are common to both segment 1 and segment 2, an "audience segment only 1" which includes users that are common to only segment 1, and an "audience segment only 2" which includes users that are common to only segment 2.

Further, audience manager 118 has calculated a demography and size of each audience segment as follows:

Audience segment only 1: 70% females (no change), 500,000 users

Audience segment only 2: 62% females (no change), 1,000,000 users

Audience segment common to both 1 and 2: 82% females, 50,000 users

Notably, target audience segment 126 is a very pure segment of the requested demography. For example, in FIG. 4D, the audience segment common to both 1 and 2 includes an audience that is 82% female. In one or more embodiments, audience manager 118 can further increase the purity of this segment, such as by adding more "sure shot" female users to this segment. Sure shot females can be determined if the publisher has access to highly reliable user data for some authenticated users or subscribers.

In one or more embodiments, audience manger 118 is configured to further increase the size of target audience segment 126. Consider, for example, that the target audience segment depicted in FIG. 4D has a very high affinity towards female users, but is relatively small at just 50,000 users. In this example, note that the request is to target the campaign to an audience that is at least 75% female and has a size of at least 100,000 users.

Thus, at 608, a size of the target audience segment is adjusted to correspond to the particular size of the request. In a first approach, at 610 audience manager 118 uses weighted mixing to adjust the size of target audience 126. In this approach, audience manager 118 implements a weighted mixing of audiences to reach the requested demography. The weighted mixing may assign weights to the target audience segment 126, as well as one or more additional audience segments that may have a lower percentage of the target demographic but a greater number of users. In one or more embodiments, audience manager 118 uses the two merged audience segments that were selected to generate the target audience segment for the weighted mixing.

In FIG. 4D, for example, audience segment only 1 has 70% females and size of 500,000, audience segment only 2 has 62% females and size of 1,000,000, and audience segment common to both 1 and 2 has 82% females and a size of 50,000.

Thus, audience manager 118 can be implemented to add users from all three segments, but in a controlled way such that the target demography of 75% females can be achieved. To do so, audience manager 118 may assign each audience segment a weight or targeting coefficient between 0 and 1. Continuing with the example above, audience manager 118 may select weights of {0.20, 0.05, 0.80} respectively for these segments. Here weight 0.20 for audience segment only 1 signifies that a user from this segment will be shown the campaign with 20% probability. In this example, after performing the weighted mixing, the expected female percentage of target audience segment 126 will be 75.3% without starvation problems.

An example of the algorithm as applied to the example above can be found below:

Zi=Audience size=>(50 k, 500 k, 1000 k)
Ai=Female %=(82, 70, 62)
Ar=Required Female %=75
Take the targeting coefficients Mi for I=>1→3 such that $$\frac{\sum_{i=1}^{k} Zi * Ai * Mi}{\sum_{i=1}^{k} Zi * Mi} = Ar$$

One example for targeting coefficients can be {1, 0.08, 0.01}. It will yield affinity as below:

$$\text{Affinity} = \frac{50*82*1 + 500*70*0.08 + 1000*65*0.01}{50*1 + 500*0.08 + 1000*0.01} = 75.5$$

The above example yield segments which have the requested demography (>75% females) without having any starvation problem. These co-efficients can be tweaked as per the request.

Alternately, in a second approach, at 612 audience manager 118 uses lookalike modeling to adjust the size of target audience segment 126. To do so, audience manager 118 takes users in the audience segment common to both 1 and 2 as the baseline segments and creates an algorithmic model that searches for eligible users based on shared characteristics from the selected population. Once algorithmic modeling is done, new larger segments can be created by adjusting accuracy and reach.

At 614, the campaign is targeted to users in the target audience segment. For example, audience manager 118 targets the campaign to users in target audience segment 126. Campaigns can be targeted in a variety of ways, such as by playing a video advertisement when a user is watching a particular video, causing a video advertisement to play in a user's social network newsfeed, and so forth.

K-Means Clustering Algorithm

As discussed above, the K-means clustering algorithm can be utilized by audience manager 118 to identify and merge similar video audience segments 120 to generate merged audience segment 124.

Generally, the K-means clustering algorithm provides a way to classify a given data set through a certain number of clusters (assume k clusters) fixed a priori. To do so, k centroids are defined, one for each cluster. Generally, the centroids are placed as far away from each other as possible. The next step is to take each point belonging to a given data set and associate it to the nearest centroid. When no point is pending, the first step is completed and an early grouping is done. At this point, knew centroids are recalculated as the barycenter of the clusters resulting from the previous step. After these k new centroids are created, a new binding is created between the same data set points and the nearest new centroid, which creates a loop. As a result of this loop the k centroids may change their location step by step until no more changes are done.

The aim of k-mean clustering algorithm is to find k-clusters such that objective function minimizes In this case, the objective function is a weighted sum of video audience segment distance from its centroid:

$$F = \sum_{i=1}^{k} J^i * Z^i$$

$F$ = objective function $Z^i$ = Number of Audiences in the cluster $J^i$ = Audience Segment distance of the cluster form its centroid $$J^i = J^i_{pmd} + J^i_{add}$$

$J^i_{pmd}$ = Program metadata distance of the segment $J^i_{add}$ = Audience Demography distance of the segment Video Metadata distance (VMD) is a metadata distance between two videos, and can be calculated as a vector difference of metadata parameters of two videos:

$$J_{vmd} = \frac{1}{n} \sum_{i=1}^{n} |x_i - \mu_i|$$

$n$ = number of metadata parameters $x_i$ = value of *ith* metadata parameters of segment $u_i$ = value of *ith* metadata parameter of the centroid $|x_i - ui|$ = distance between two metadata parameter on the scale of 0 to 100. It is defined as $$|x_i - u_i| = \begin{cases} \frac{x_i - u_i}{x_i + u_i} * 100, & x_i \text{ is number} \\ 100, & \text{not a number and } x_i \neq u_i \\ 0, & \text{not a number and } x_i = u_i \end{cases}$$

Audience Demographic Distance (ADD) is an Audience demographic distance between two clusters. For example, if one cluster is 60% female and another is 62% female, then it means that these two segments are quite close in terms of Audience demography. In contrast, if the second segment is only 40% female, then it means that these two segments are quite different.

$$J_{add} = |x_a - u_a| = \frac{x_a - u_a}{x_a + u_a} * 100$$

Bayes' Theorem

As discussed above, audience manager 118 can utilize Bayes' theorem when generating target audience segment 126. Generally, Bayes' Theorem can be seen as a way of understanding how the probability that a theory is true is affected by a new piece of evidence. Consider the following formula:

$$P(A \mid B) = \frac{P(B \mid A)P(A)}{P(B \mid A)P(A) + P(B \mid \neg A)P(\neg A)}.$$

In this formula, T stands for a theory or hypothesis that is to be tested, and E represents a new piece of evidence that seems to confirm or disconfirm the theory. For any proposition S, we P(S) will stand for the degree of belief, or "subjective probability," that S is true. In particular, P(T) represents the best estimate of the probability of the theory being considered, prior to consideration of the new piece of evidence. It is known as the prior probability of T.

In this case, A and B can be replaced as follows:

$A \Rightarrow$ Female and $B \Rightarrow (s1 \cap s2)$ $$P(f \mid s1 \cap s2) = \frac{P(f) * P(s1 \cap s2 \mid f)}{P(f) * P(s1 \cap s2 \mid f) + P(m) * P(s1 \cap s2 \mid m)} = \frac{1}{1 + \frac{P(m) * P(s1 \cap s2 \mid m)}{P(f) * P(s1 \cap s2 \mid f)}}$$

As these segments s1 and s2 are made using K-mean algorithm it can be safely assumed that these segments are quite independent, which means:

$$P(s1 \cap s2 \mid m) = P(s1 \mid m) * P(s2 \mid m) = \frac{M_{s1}}{M_{total}} * \frac{M_{s2}}{M_{total}}$$

$$P(s1 \cap s2 \mid f) = P(s1 \mid f) * (s2 \mid f) = \frac{F_{s1}}{F_{total}} * \frac{F_{s2}}{F_{total}}$$

So $$\frac{P(m) * P(s1 \cap s2 \mid m)}{P(f) * P(s1 \cap s2 \mid f)} = \frac{F_{total}}{M_{total}} * \frac{M_{s1}}{M_{s1}} * \frac{M_{s2}}{F_{s2}}$$

$$P(f \mid s1 \cap s2) = \frac{1}{1 + \frac{F_{total}}{M_{total}} * \frac{M_{s1}}{F_{s1}} * \frac{M_{s2}}{F_{s2}}}$$

In the equations above, the variable are as follows:

$M_{s1}$=Male viewers in segment s1

$F_{s1}$=Female viewers in segment s1

$T_{s1}$=Total viewers in segment s1=$M_{s1}$+$F_{s1}$ $M_{total}$=Male viewers in total viewers of the programmer=4.8 Million $F_{total}$=Female viewers in total viewers of the programmer=5.2 Million $T_{total}$=Total viewers of the programmer=$M_{total}$+$F_{total}$=10 Million $$P(f) = \text{Probability of a viewer being a female}$$
$$= \frac{\text{Female vieweres}}{\text{Total viewers of the programer}}$$
$$= \frac{F_{total}}{T_{total}}$$

$$P(s1) = \text{Probability that an Audience lies in segment 's1'}$$
$$= \frac{\text{Audience size of } s1}{\text{Total viewers of the programer}}$$
$$= \frac{T_{s1}}{T_{total}}$$

-continued $P(f | s1) =$
   Probability of a viewer being a female in the segment 's1' = 0.70
$P(f | s2) =$
   Probability of a viewer being a female in the segment 's2' = 0.65
$P(s1 \cap s2) =$ Probability that an Audience
   lies in both segment s1 and s2.

$$P(f | s1 \cap s2) = \cfrac{1}{1 + \cfrac{F_{total}}{M_{total}} * \cfrac{M_{s1}}{F_{s1}} * \cfrac{M_{s2}}{F_{s2}}} =$$

$$= \cfrac{1}{1 + \cfrac{48}{52} * \cfrac{30}{70} * \cfrac{35}{65}} = \cfrac{1}{1 + 0.213} = 0.82$$

Thus, a target audience segment is generated which has a high affinity to females. The size of this segment can be obtained from audience manager 118, such as via an API call. The approximate size of the segment can also be calculated theoretically as follows:

$T_{s1 \cap s2}$=Number of audiences common to both segment s1 and s2.

$$= T_{total} * P(s1) * P(s2) = \frac{Ts1 * Ts2}{T_{total}} = \frac{500 \text{ K} * 1 \text{ mn}}{10 \text{ mn}} = 50 \text{ K}$$

Example System and Device

FIG. 7 illustrates an example system generally at 700 that includes an example computing device 702 that is representative of one or more computing systems and/or devices that may implement the various techniques described herein. This is illustrated through inclusion of audience manager 118 and data management platform 122 which may be configured to implement creating audience segments for campaigns as previously described.

The computing device 702 may be, for example, a server of a service provider, a device associated with a client (e.g., a client device), an on-chip system, and/or any other suitable computing device or computing system. The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may comprise semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A system comprising:
a data management platform; and
one or more modules implemented at least partially in hardware and configured to implement an audience manager, the audience manager configured to:
for at least two videos, create a video audience segment associated with each respective video by storing, in the data management platform, user identifiers of users that viewed the respective video;
extract demographic information from a demographic report associated with each respective video, the demographic report generated by a third party demographics provider that is unaffiliated with the audience manager;
associate the respective demographic information with each respective video audience segment stored in the data management platform;
identify at least two similar video audience segments stored in the data management platform;
merge the at least two similar video audience segments to generate a merged audience segment that includes only user identifiers that are common to each of the at least two similar audience segments; and
store the merged audience segment in the data management platform.

2. The system as recited in claim 1, wherein the audience manager is configured to identify the two or more similar video audience segments based on at least one of a similarity of video metadata associated with the two or more similar video audience segments or a similarity of demographic information associated with the two or more similar video audience segments.

3. The system as recited in claim 1, wherein the audience manager is configured to identify and merge the two or more similar video audience segments using a k-means clustering algorithm.

4. The system as recited in claim 1, wherein the demographic report indicates a percentage of the users that viewed the video that are associated with at least one of a particular gender, a particular age range, a particular income level, or a particular location.

5. The system as recited in claim 1, wherein user identifiers that are in just one of the at least two similar audience segments are not included in the merged audience segment.

6. The system as recited in claim 1, wherein the audience manager is further configured to:
receive a request to target a campaign to an audience of a particular demography;
identify two merged audience segments in which a majority of the users are associated with the particular demography; and
generate a target audience segment that includes user identifiers of users that are common to both of the identified two merged audience segments.

7. The system as recited in claim 6, wherein the request further includes a request to target the campaign to an audience of a particular size, and wherein the audience manager is further configured to increase a size of the target audience segment to correspond to the particular size of the request using weighted mixing of the target audience segment with one or more other audience segments.

8. The system as recited in claim 6, wherein the request further includes a request for an audience of a particular size, and wherein the audience manager is further configured to increase the size of the target audience segment using lookalike modeling.

9. The system as recited in claim 6, wherein the audience manager is further configured to target the campaign to users of the target audience segment.

10. A computer-implemented method comprising:
maintaining video audience segments associated with videos in a data management platform, the video audience segments including user identifiers corresponding to users that viewed a video associated with the respective video audience segment and demographic information associated with the users of the respective video audience segment;
receiving a request to target a campaign to an audience of a particular demography;
identifying at least two video audience segments maintained in the data management platform in which a majority of the users are associated with the particular demography;
generating a target audience segment that includes only user identifiers of users that are common to each of the identified at least two video audience segments; and
targeting the campaign to the users in the target audience segment.

11. The computer-implemented method as recited in claim 10, wherein the request further includes a request to target the campaign to an audience of a particular size.

12. The computer-implemented method as recited in claim 11, further comprising increasing a size of the target audience segment to correspond to the particular size of the request using weighted mixing of the target audience segment with one or more other audience segments.

13. The computer-implemented method as recited in claim 11, further comprising increasing the size of the target audience segment to correspond to the particular size of the request using lookalike modeling.

14. The computer-implemented method as recited in claim 10, wherein the identified at least two video audience segments comprise merged audience segments formed by merging two or more of the video audience segments that are similar.

15. A computer-implemented method comprising:
for two or more videos, creating a video audience segment associated with each respective video by storing, in a data management platform, user identifiers of users that viewed the respective video;
extracting demographic information from a demographic report associated with each respective video, the demographic report generated by a third party demographics provider;
associating the respective demographic information with each respective video audience segment stored in the data management platform;
identifying two or more similar video audience segments stored in the data management platform;
merging the similar video audience segments to generate a merged audience segment that includes only user identifiers that are common to each of the two or more similar audience segments; and
storing the merged audience segment in the data management platform.

16. The computer-implemented method as recited in claim 15, wherein the user identifiers are received from a client player each time that a video is played back at the client player.

17. The computer-implemented method as recited in claim 15, wherein the identifying the two or more similar video audience segments further comprises identifying the two or more similar video audience segments based on at least one of a similarity of video metadata associated with the two or more similar video audience segments or a similarity of demographic information associated with the two or more similar video audience segments.

18. The computer-implemented method as recited in claim 15, further comprising:
receiving a request to target a campaign to an audience of a particular demography;
identifying two merged audience segments in which a majority of the users are associated with the particular demography; and
generating a target audience segment that includes user identifiers of users that are common to both of the identified two merged audience segments.

19. The computer-implemented method as recited in claim 18, further comprising targeting the campaign to users of the target audience segment.

20. The computer-implemented method as recited in claim 15, wherein user identifiers that are in just one of the at two or more similar audience segments are not included in the merged audience segment.

* * * * *